United States Patent [19]
Weishut et al.

[11] Patent Number: 5,923,737
[45] Date of Patent: Jul. 13, 1999

[54] TERMINAL

[75] Inventors: Gideon M. R. Weishut, Eindhoven; Mascha M. C. C. Van Oosterhout, Eemnes; Walter J. Slegers, Eindhoven, all of Netherlands

[73] Assignee: U.S. Philips Corporation, New York, N.Y.

[21] Appl. No.: 08/706,049

[22] Filed: Aug. 30, 1996

[30] Foreign Application Priority Data

Aug. 31, 1995 [EP] European Pat. Off. .............. 95202348

[51] Int. Cl.⁶ ........................... H04M 11/00; G06F 13/00
[52] U.S. Cl. ..................... 379/93.17; 379/93.21; 379/93.23; 345/330; 345/351
[58] Field of Search .............................. 379/93.01, 93.17, 379/93.21, 93.23, 157, 201–204; 345/329–331, 326, 339, 348, 351, 349, 961

[56] References Cited

U.S. PATENT DOCUMENTS

| | | | |
|---|---|---|---|
| 4,653,090 | 3/1987 | Hayden | 379/204 |
| 4,953,159 | 8/1990 | Hayden et al. | 379/93.21 |
| 5,347,628 | 9/1994 | Brewer et al. | 345/351 |
| 5,533,110 | 7/1996 | Pinard et al. | 379/93.23 |
| 5,627,978 | 5/1997 | Altom et al. | 345/330 |

OTHER PUBLICATIONS

Gaver et al., Europarc's Rave System, pp. 28–35, May 1992.

*Primary Examiner*—Curtis A. Kuntz
*Assistant Examiner*—George Eng

[57] ABSTRACT

A communication terminal for use in a communication system comprises a display unit having a display screen onto which call states of different terminals in the system are represented by means of icons of different sizes and shapes, depending on the current call state of the terminal itself and the call states of other terminals in the system, in a quasi three-dimensional communication scene so as to graphically represent and distinguish terminal users involved in a communication scenario, displaying of the icons being such that a terminal user of the terminal perceives a substantial change of the communication scene upon call state changes of the terminal and other terminals in the system.

13 Claims, 10 Drawing Sheets

TERMINAL

The invention relates to a terminal for use in a communication system, the terminal comprising graphical representation means, display means for displaying icons on the graphical representation means.

A terminal according to the preamble is known from U.S. Pat. No. 4,653,090. An icon is a small pictorial representation of some larger set of information, that is accessed or operated upon through actuation of the icon. Icons have turned out to be useful tools, designed to trigger within the mind of the human through visual perception, user concepts that quickly communicate the contents or operation of an apparatus or system. The icons used in the terminal described in the cited patent are small telephones with the name of the corresponding party written near them. The icons are shown in so called call appearance boxes. The call appearance boxes are representative for calls between the parties corresponding to the icons shown in the call appearance boxes. The state of the call represented by the call appearance box, incoming, active or on-hold is indicated by the colour of the icons in that box. The icons can be inserted into the boxes, moved between the boxes or moved from the boxes, this resulting respectively in adding the corresponding parties to calls, moving them between calls or releasing them from calls. By mouse clicking within a call appearance box the call between the parties of which the icons are shown in that box is brought into the active call state, thereby automatically bringing the calls of all other call appearance boxes in the on-hold state. This means that the active call can be represented in any of the call appearance boxes.

Because of the fact that the active call can be represented in any of the call appearance boxes, the user needs to discriminate between the colours of the icons in each call appearance box, in order to find out which of the boxes comprises the active call. This can be difficult, especially due to sun light or artificial light entering on the graphical representation means. Furthermore the user needs to learn by which specific colours the various known call states are indicated and of course this known terminal is surely not appropriate for use by colour blind persons.

It is an object of the invention to improve the representation of call states, so as to enhance the recognizability thereof.

Thereto a terminal according to the preamble is characterized in that, the display means are arranged for using icons with different sizes and/or shapes to represent parties in different call states. This leads thereto that even when sun light or artificial light enters on the graphical representation means the user can discriminate between the different call states.

An embodiment of the terminal according to the invention is characterized in that, the display means are arranged for displaying the icons on different fixed locations of the graphical representation means to represent the parties in different call states. This leads thereto that the discrimination between the call states is even easier, since icons representing parties in a certain call state are always shown on the same fixed location.

A further embodiment of the terminal according to the invention is characterized in that, the display means are arranged to discriminate between an incoming call state, a connected call state and an on-hold call state of the parties. These call states are the most important call states for the user to know. Discriminating between more call states would unnecessarily complicate the use of the terminal by the user.

A further embodiment of the terminal according to the invention is characterized in that, the icons are figurines. Figurines are defined as icons represented in the form of persons. Using figurines for representing the parties with which the terminal has calls, is very intuitive and natural for the user, since a party normally is a person.

A further embodiment of the terminal according to the invention is characterized in that, when a party is in the incoming call state, the display means are arranged to represent the party by a figurine, which is waving. Since waving people just like incoming calls want attention, this representation is a very natural one.

A further embodiment of the terminal according to the invention is characterized in that, when a party is in the connected call state the display means are arranged to represent the party by a figurine, which is standing in front of a desk. Such a figurine, especially when it is shown bigger than other figurines, is a logic representation of the connected call state.

A further embodiment of the terminal according to the invention is characterized in that, when a party is in the on-hold call state the display means are arranged to represent the party by a figurine, which is sitting on a couch. Parties in the on-hold state are waiting for the user to carry out an action on them, like connecting them or transferring them to another terminal. Representing those parties by figurines sitting on a couch is very intuitive and natural, because waiting in every day life frequently takes place sitting on a couch.

A further embodiment of the terminal according to the invention is characterized in that, the terminal comprises control means for controlling calls with the parties by exchanging signalling messages with the communication network and actuating means for actuation of icons on the graphical representation means thereby initiating changes in the state of the terminal, whereby the control means are arranged to send appropriate signalling messages to the communication network upon actuation of icons. So, by actuating i.e. selecting or moving of the icons the user can easily handle calls.

A further embodiment of the terminal according to the invention is characterized in that, the control means are arranged for setting up a conference call between the terminal, a first and a second party, when an icon representative for a conference call is selected by the actuating means, the first party is in the connected call state and the second party is in the on-hold call state and selected by the actuating means. So, when the user presently has a connected call with a first party and wants to set up a conference call, he only has to carry out two actions: selecting the conference call icon and selecting a second party in the on-hold state, which party is to be included in the conference call.

A further embodiment of the terminal according to the invention is characterized in that, the control means are arranged for carrying out a call transfer between a first party and a second party, when the first party is in the connected call state and selected by the handling means and the second party is in the on-hold call state and selected by the handling means. So transferring of a call only needs two user actions.

A further embodiment of the terminal according to the invention is characterized in that, when an icon representative for call blocking is selected the control means are arranged for blocking incoming calls. Blocking calls by selecting an icon is more pleasant for a user than by buttons, as was done in telephones up till now.

A further embodiment of the terminal according to the invention is characterized in that, the icon representative for call blocking is a door, which is closed when call blocking is selected and open when call blocking is not selected. The use of this icon gives a very natural indication, whether the blocking calls function has been selected or not.

A further embodiment of the terminal according to the invention is characterized in that, the displaying means are arranged for representing call states of other terminals in the communication system by icons. In this way the user of the terminal is informed about the call states in a more direct way than by LEDs, which are normally used for this purpose.

A further embodiment of the terminal according to the invention is characterized in that, the display means are arranged for displaying an absent/present icon in the form of a light switch, and in that when the light switch is selected at least part of the graphical representation means is dark.

So, the user can indicate his absence/presence in a very natural way, by "turning on" or "turning off the light", just like he does at home or in the office.

A further embodiment of the terminal according to the invention is characterized in that, the displaying means are arranged for displaying absence of users of other terminals in the communication system. So, the user immediately knows if users of other terminals are absent or not, thereby avoiding a waste of time trying to call them, when they are not there.

A further embodiment of the terminal according to the invention is characterized in that, the displaying means are arranged to change the icons representing parties, which put the terminal on hold. Such a change makes it visible to the user of the terminal, if he is put on hold by other parties or not. The time that he is put on hold by the other party, he can put this party on hold, also. He can then do other things, like making a new call.

The present invention will become more clear in conjunction with the accompanying figures of which:

In the figures identical parts are provided with the same reference numbers.

Figure 1:
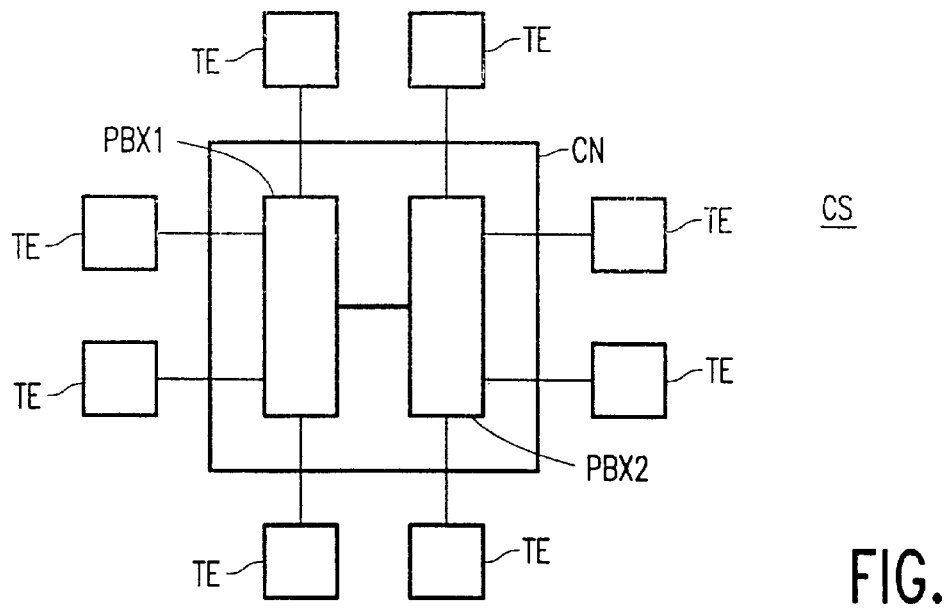
FIG. 1 is a block diagram of a communication system.

In FIG. 1 a block diagram is shown of a communication system CS consisting of a communication network CN and a number of terminals TE connected to the network. The communication network is here shown as consisting of two private telephone exchanges PBX1 and PBX2 but can of course be in every other known form.

Figure 2A:
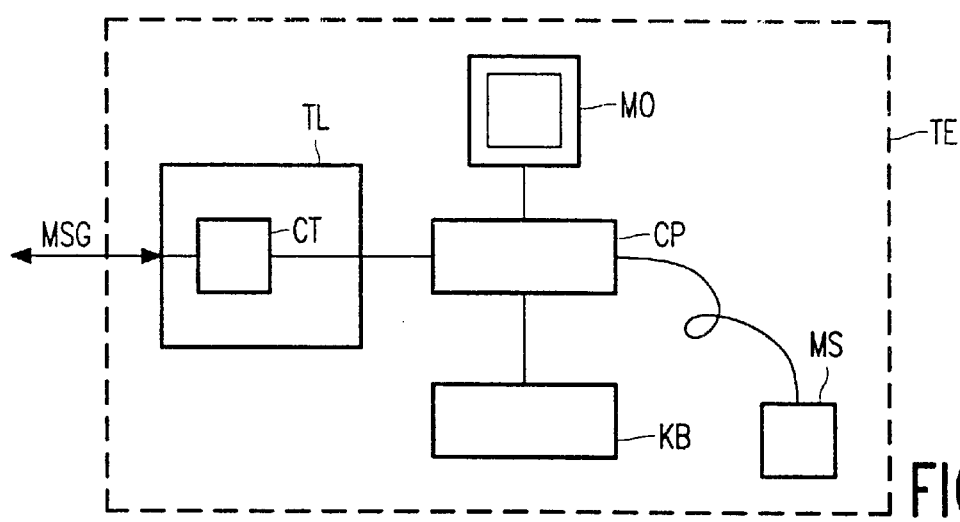
FIG. 2a and 2b are block diagrams of terminals for use in a communication system.
Figure 2B:
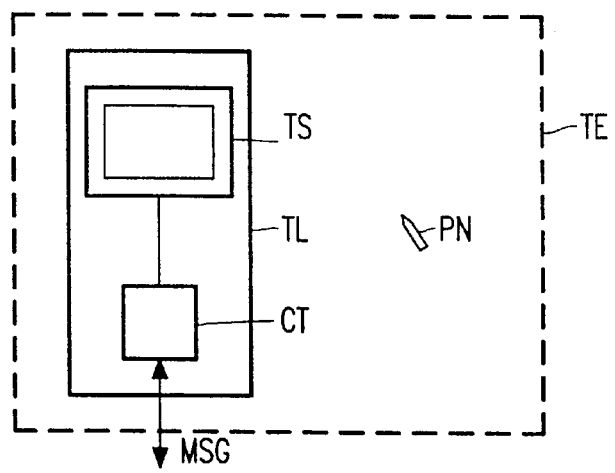

FIGS. 2a and 2b show block diagrams of two terminals TE according to the invention. The terminal of FIG. 2a consists of a relatively simple telephone set TL, of which only the control means are shown and a PC-configuration coupled thereto. The PC-configuration is formed by a computer CP, a keyboard KB, a monitor MO and a mouse MS. The computer and the telephone are coupled via a suitable interface, for example a RS232-interface. The terminal of FIG. 2b consists of a more enhanced telephone set comprising a touch screen TS and a pen PN for giving user commands via the touch screen.

The control means CT of both terminals are in a known way arranged for controlling calls between the terminal and further terminals connected to the communication network. They thereto exchange signalling messages MSG with the communication network. In both terminals the call states of calls with other terminals are represented on the monitor MO or touch screen TS, respectively. Thereto appropriate software is present, translating incoming signalling messages in changes of call states and thus also in changes in the representation. The representation of calls is given in the form of icons. By selecting and manipulating the icons by use of the keyboard, the mouse or by touching the touch screen with the pen PN, or even a finger the user can manipulate the calls. Thereto appropriate software is present translating such manipulations in signalling messages, which are sent to the communication network and also changing the representation of the calls accordingly. In the terminal according to FIG. 2a the software can be divided over the computer CP and the control means CT in the telephone, in FIG. 2a, the control means CT are arranged for generating and displaying icons and a communication scene on monitor MO, and in FIG. 2b, the controlling being distributed over the control means CT and the computer PC. In the terminal according to FIG. 2b all the software is present in the control means in the telephone itself.

Figure 3:
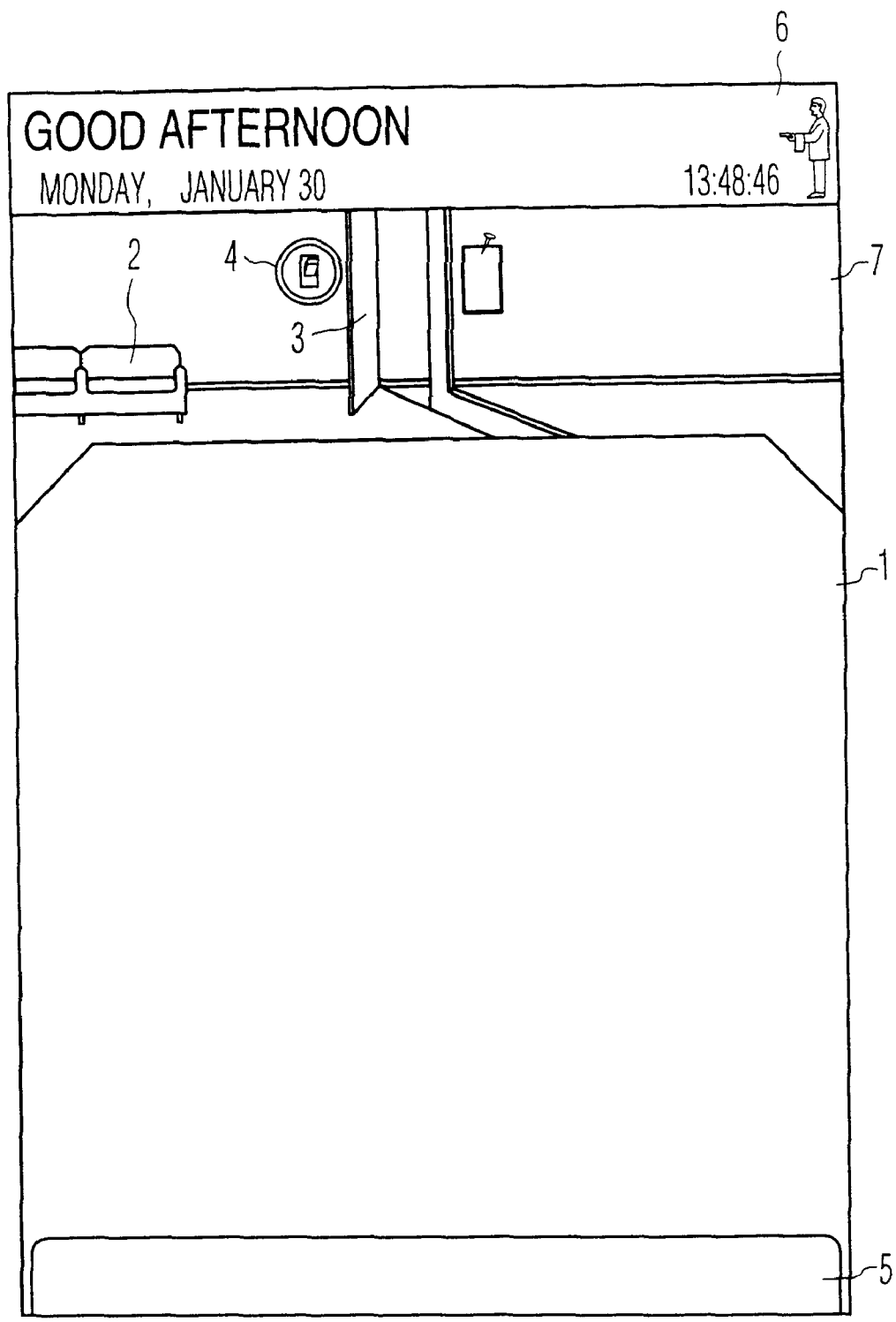
FIG. 3–11 are graphical representations of various states of the terminal.
Figure 4:
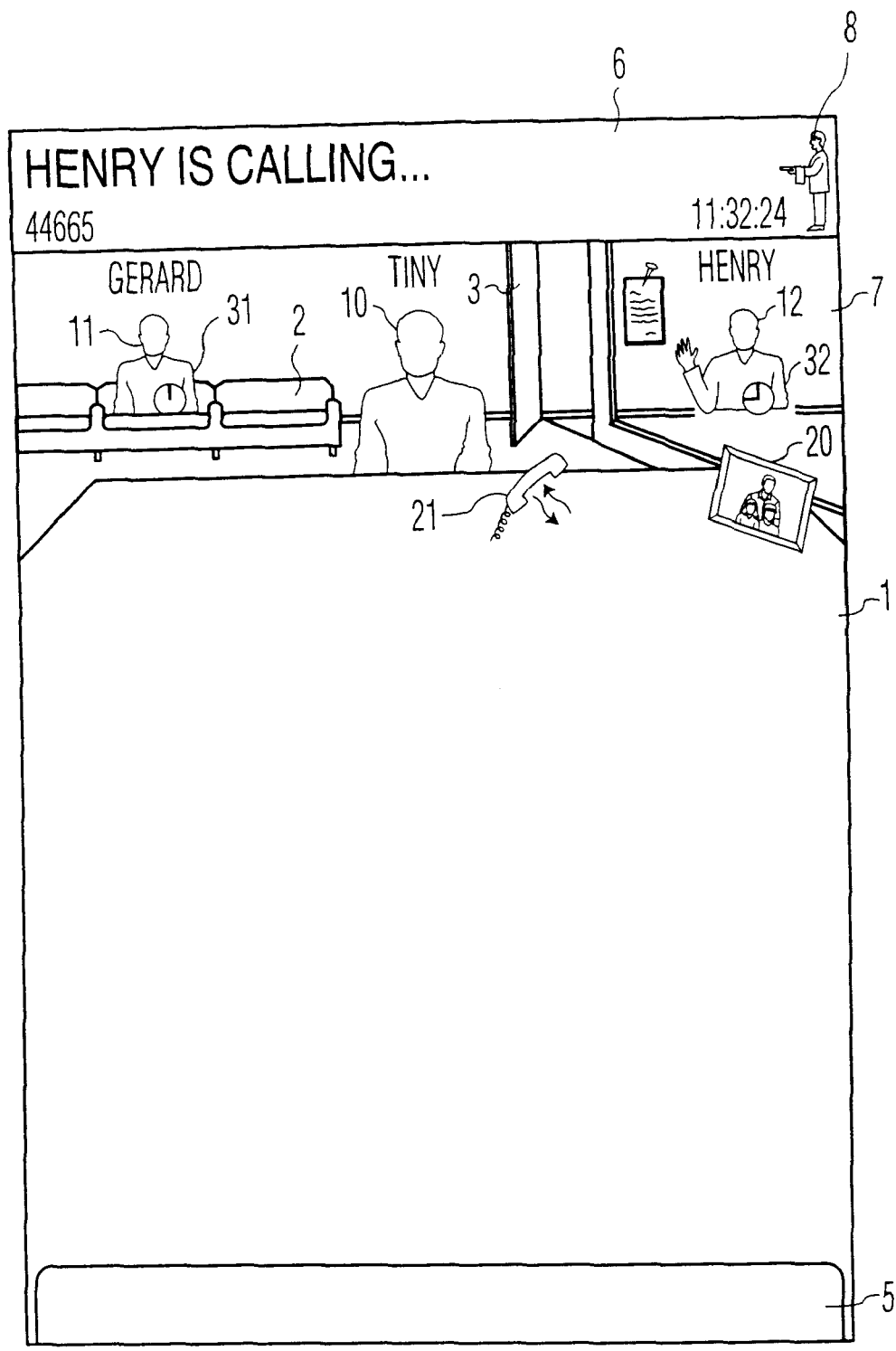

FIG. 3 shows the representation given, when the terminal is in an idle state, so when no calls are present. The semaphore, which is used is an office. Such an office semaphore is very useful, when the terminal is a business telephone, because an office is the every day environment of the user of such a business telephone. The office comprises a desk 1, a couch 2, a door 3 and a light switch 4, which are all features present in almost every office. Through a window a corridor 7 can be seen. There are also a bar 5 at the bottom of the presentation, which comprises a number of icons relating to functions of the terminal. The bar at the top 6 is arranged for displaying in the form of text, useful information for the user. FIG. 4 shows the representation, when there are calls. The icon 10 which is represented in front of the desk 1 is representative for the party with whom the user has a connected call. The icon has the form of a figurine. Figurines are defined to be icons represented in the form of persons. This appears to be a very natural representation, because the party, which the figurine represents normally is a person. Another figurine 11, sitting on the couch represents a party of which the call has been set on-hold. On-hold parties are waiting for the user to carry out an action on them, like connecting them or transferring them to another terminal. Representing those parties by figurines sitting on a couch is very intuitive and natural, because waiting in every day life frequently takes place sitting. Another figurine 12 waving in the corridor is representative for a party of whom the call is in the incoming call state. This means that, that party is trying to reach the user of the terminal but the user has not answered, yet. Waving is a way to ask for attention. Since the incoming call needs the attention of the user, this way of representing is very natural. Also the position of the figurine 12 in the corridor, so outside the office, triggers the user immediately to the fact that this call has not been answered, yet. All the figurines representative for parties in a certain call state are always represented in the same way and at the same position. So, calls in the on-hold state are represented sitting on the couch, connected calls are represented standing in front of the desk and incoming calls are represented waving in the corridor. In this way the user at a glance sees the situation of all the calls, he is dealing with. When the terminal knows the name of a party, this name is displayed near the corresponding icon. Otherwise the number of the party, which in ISDN-systems is always sent during the initial phase of a call, is shown. It is possible that more incoming calls or calls in the on-hold state are present. The figurines representing parties in these call states are shown together in the corridor or on the couch. When a party is set on the couch, the couch rolls into the office creating an empty seat for a new party to be set on the couch. Near the parties in the on-hold call state or the incoming call state small clocks 31 32 are shown. These clocks are gradually filled every few seconds. In this way it can approximately be seen how long the corresponding parties are in the incoming state or on-hold state, respectively and which one of a number of parties is in a certain state the longest.

The user can manipulate calls by actuating of icons. The user can put a connected party on-hold by tapping the figurine representing that party and then tapping the couch. The party is then represented by a figurine sitting on the couch. Putting a party, which is in the on-hold state, into the connected state can simply be done by tapping the figurine sitting on the couch representing this party. If there already is a party in the connected state, this party is put in the on-hold state, automatically. This is represented by letting the figurines representing the parties change places between the desk and the couch. A call transfer can be realised by first tapping a party in the connected state and then tapping a party in the on-hold state, as a result of which those two parties will be connected.

The upper bar 6 comprises an icon 8 in the form of a butler. By clicking this icon the user can get access to a number of options. One of the options is to put some more icons on the desk 1, like a family photo 20, which represents the possibility to make a conference call or a telephone receiver 21, which represents the possibility to force an on- or off hook signal. Whenever the user wants, he can select those icons for setting up a conference call or forcing an on- or off hook signal, respectively.

Figure 5:
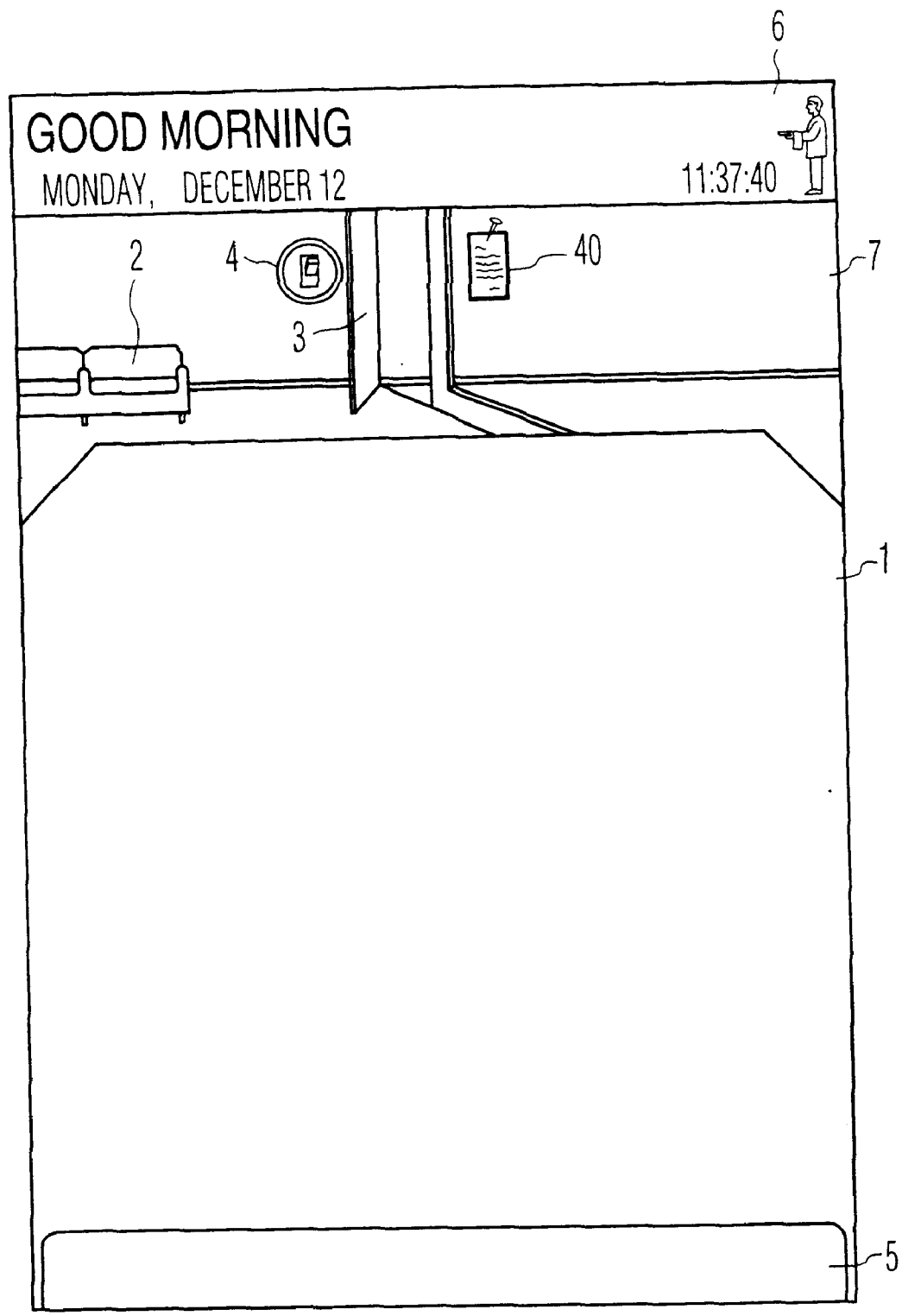

FIG. 5 shows how the user can activate the call blocking feature and how this is shown. The call blocking feature is selected simply by selecting the icon 3 in the form of a door, which results in this door being closed. A slam is heard, when the door is closed. When the user wants he can fill out a note, stating what the terminal has to do with incoming calls, if they have to be diverted to other numbers or if some very specific calls even during the call blocking state are to be received, etc. When he has filled out this note, it is put in a smaller form near the door (icon 40), thereby indicating that the user has left instructions to the terminal about the treatment of incoming calls. Representing the call blocking state, by a closed door appears to be very natural, since people in an office, generally close their doors, when they do not want to be disturbed and leave them open when they do not have a problem in being disturbed.

Figure 6:
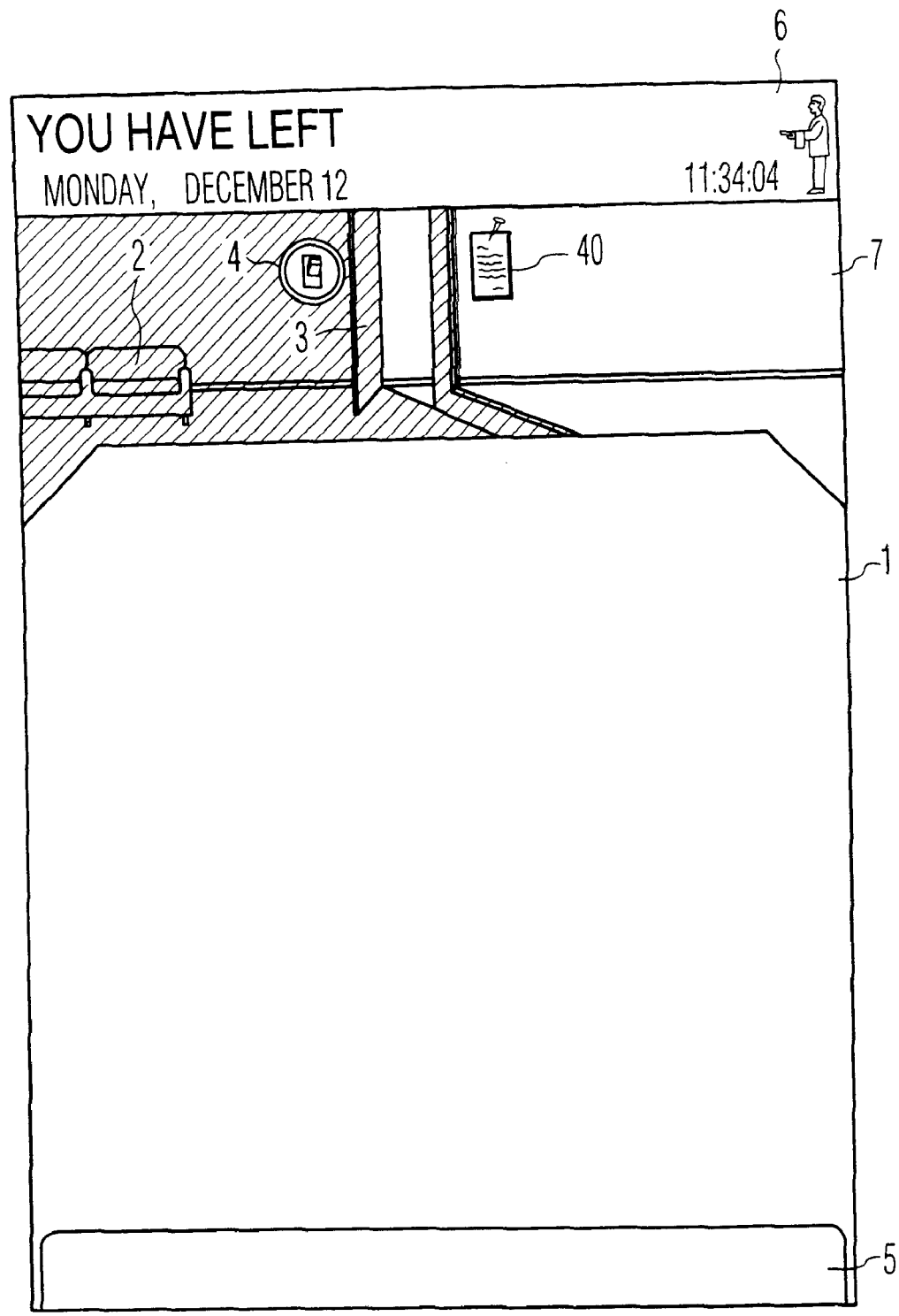

FIG. 6 shows how the user can indicate, if he is absent or not and how the absent state is indicated. The user simply indicates his absence/presence by switching the light switch 4. Absence is represented by a dark office as shown in the figure, while presence is represented by an illuminated office, just like in every day life. The control means are arranged for communicating the absence of the user of the terminal to other terminals, the users of those terminals thereby being informed of the absence of the user.

Figure 7:
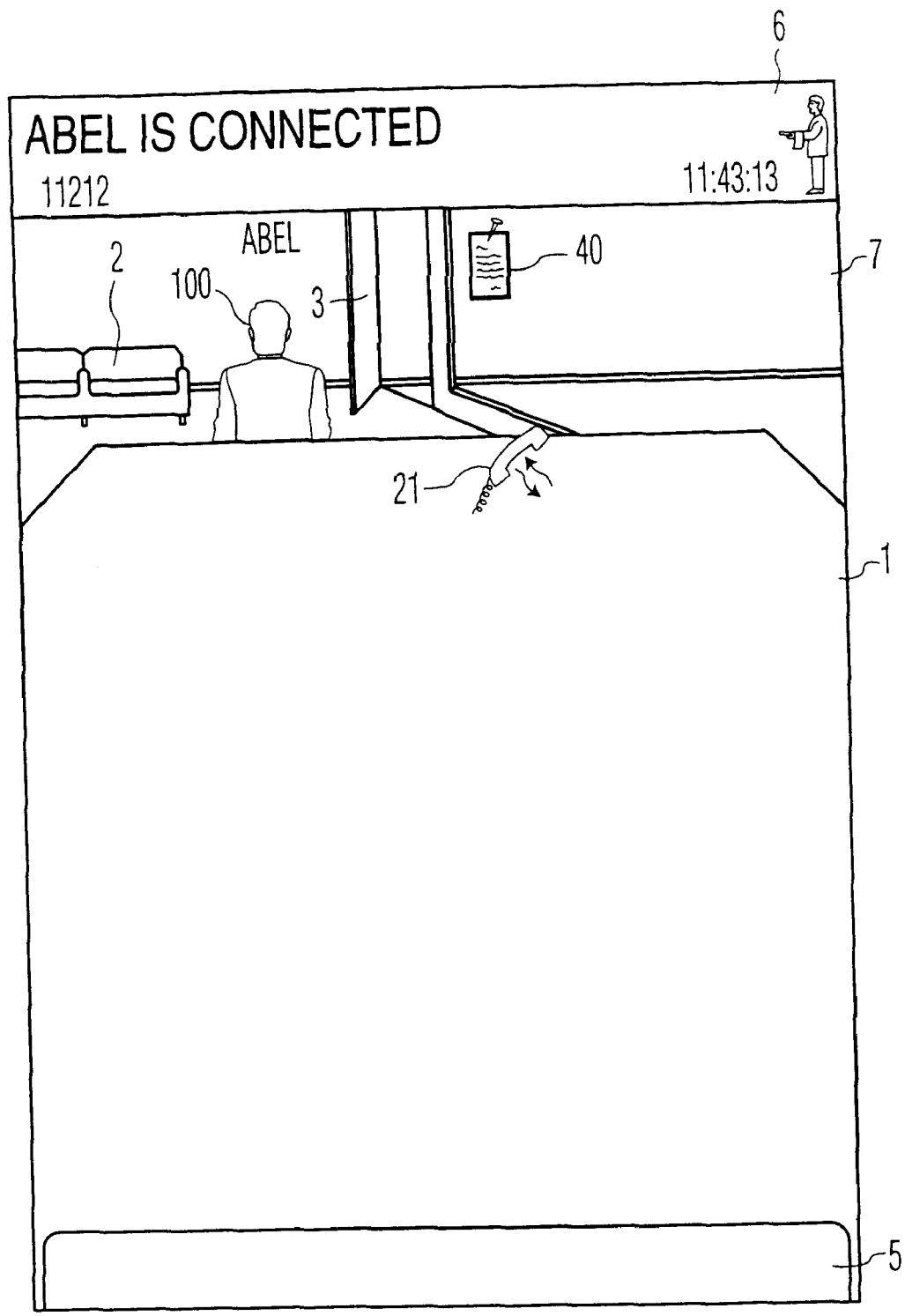

FIG. 7 shows what happens when the terminal is put on hold by another party. The icon representing this party is then changed to give the user a visual indication, that he is put on hold by the other party. The change shown in FIG. 7 exists in showing a figurine, which has turned his back on the user. During the time that he is put on-hold by the other party, he can do other things like parking the party as well, this resulting in a figurine sitting on the couch 2, still turning his back on the user, and then making a new call. When the other party ends the on-hold situation the figurine representing it is shown in front view, again. The user can then connect this party again and continue the conversation.

Figure 8:
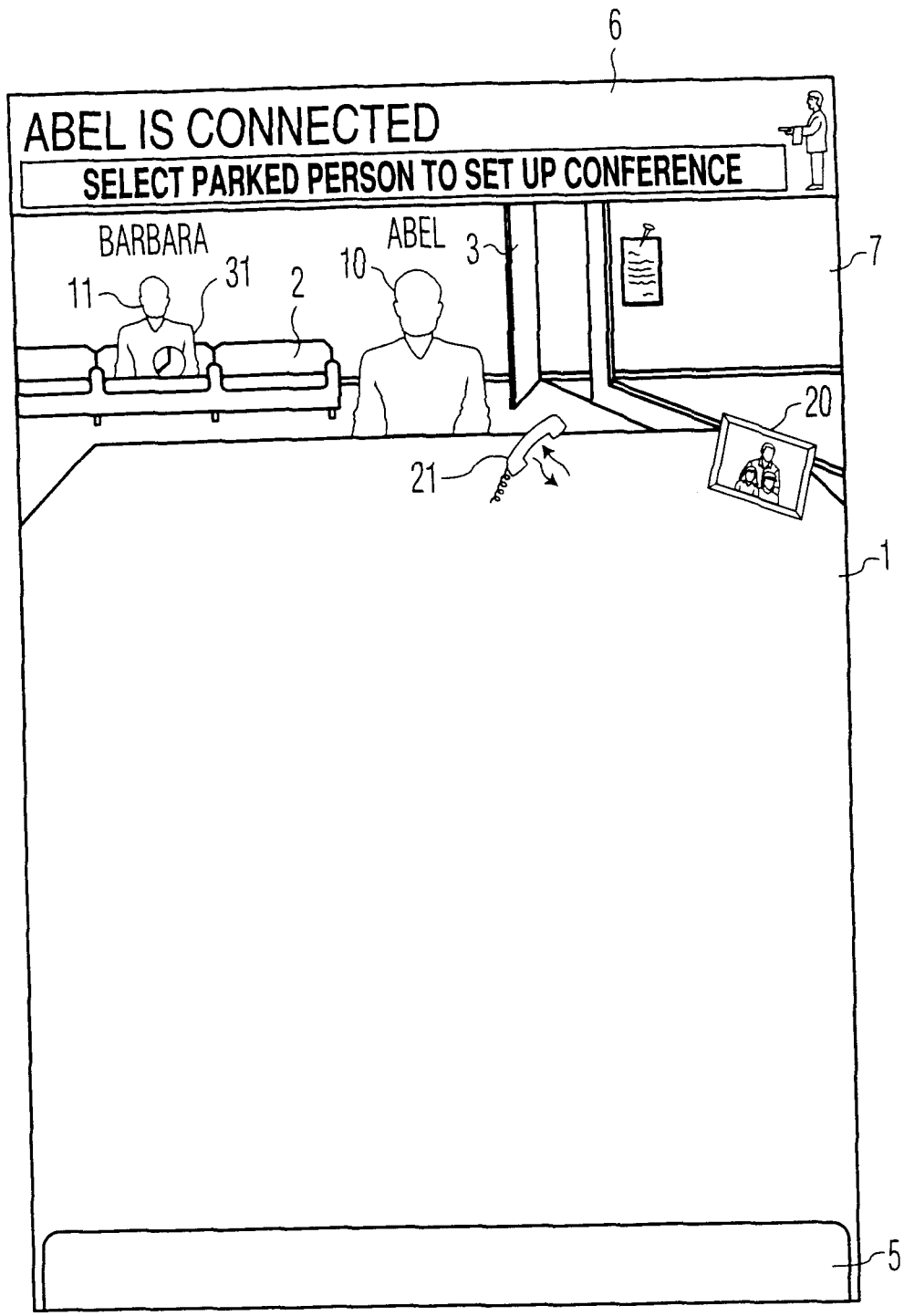
Figure 9:
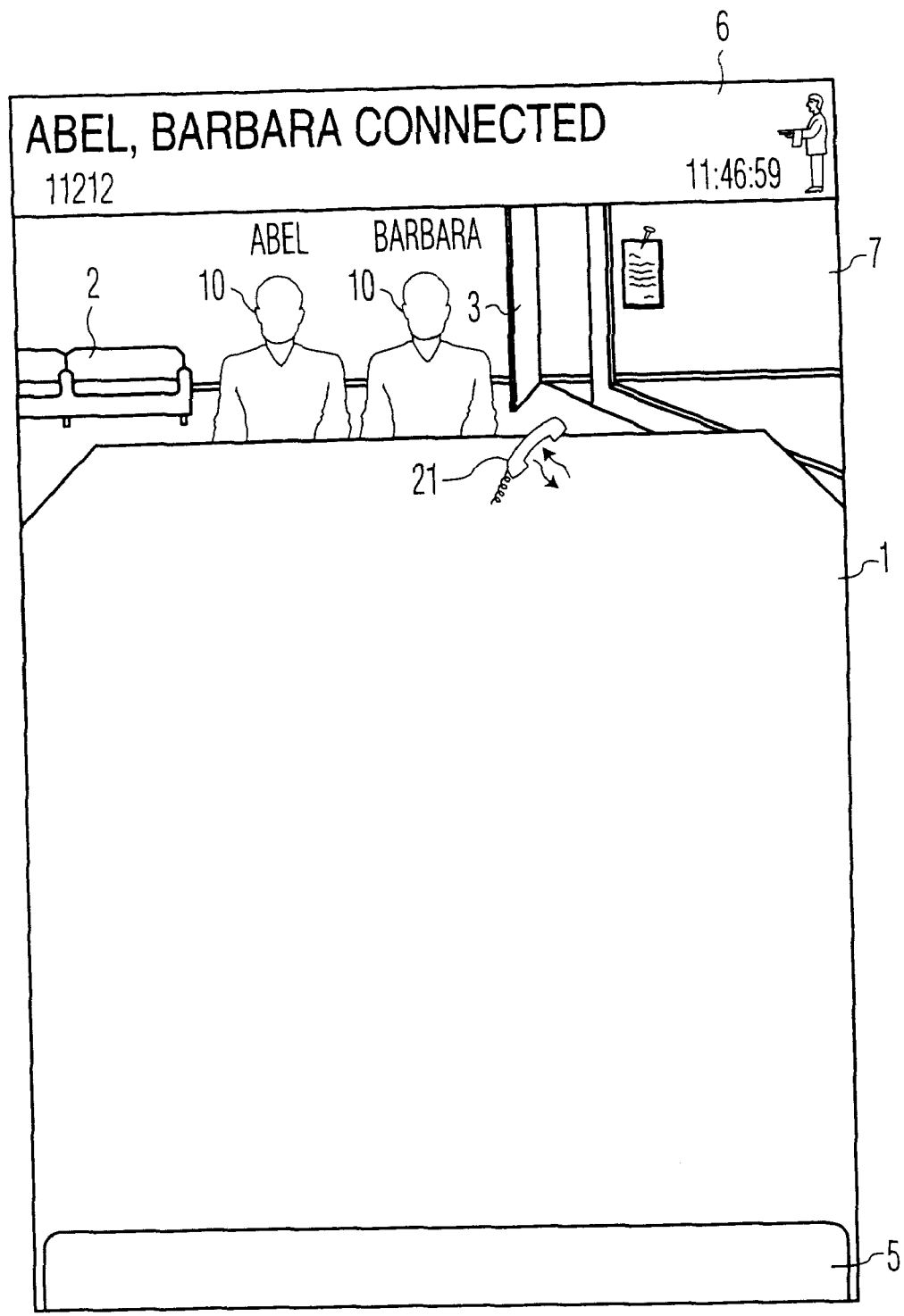

FIG. 8 and 9 show how a conference call is to be set up and how it is represented. When a user want to set up a conference call, he has to assure that he has one party in a connected call state and another party in an on-hold call state (FIG. 8, figurine 10 and 11). He then has to tap the icon representative for conference calls 20 and then simply select the figurine sitting on the couch 11. This results in a conference call between the user and those two parties. The representation of this state is shown in FIG. 9, in which two figurines 10 are standing before the desk.

Figure 10:
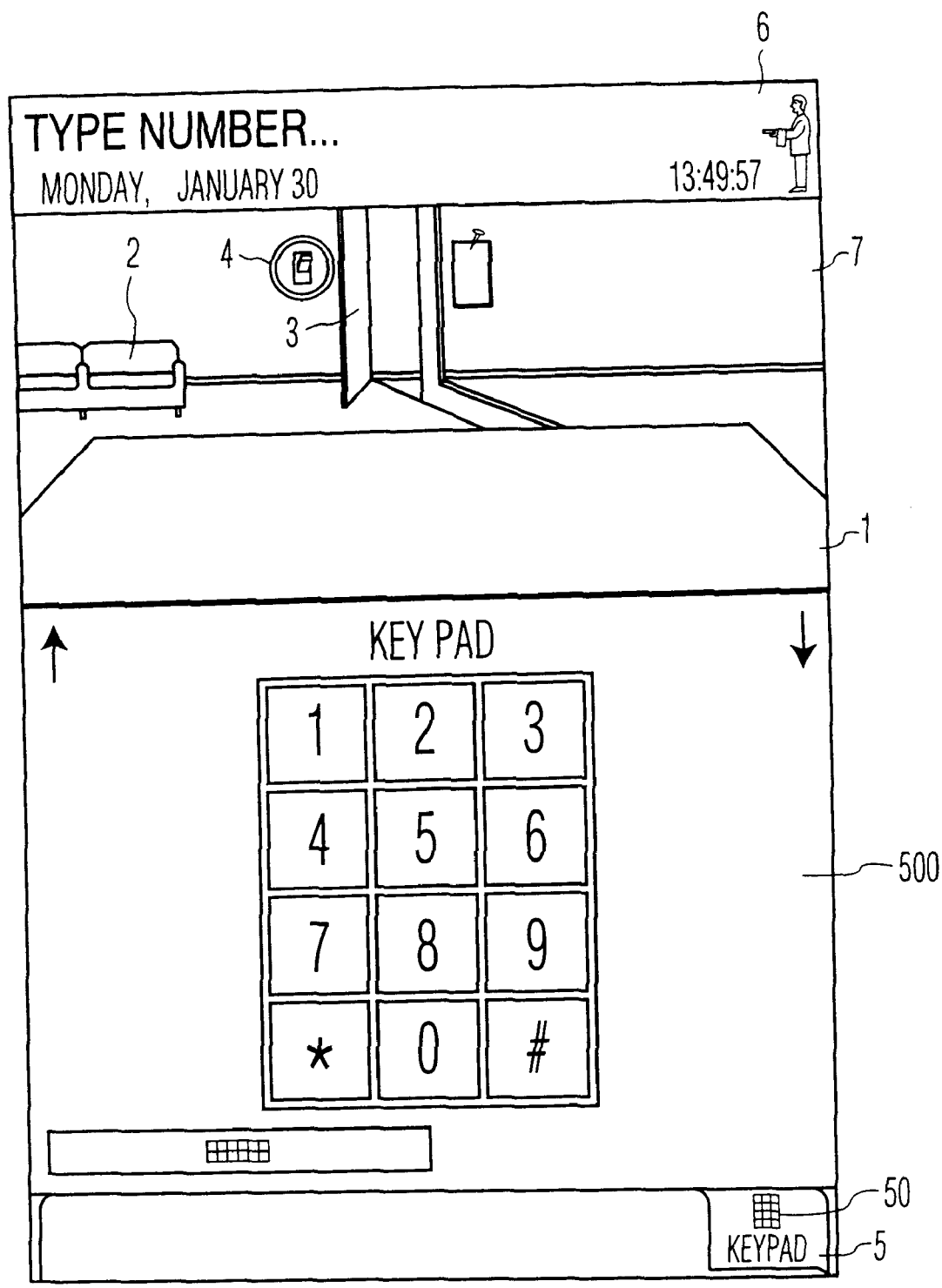

FIG. 10 shows how dialling takes place. In order to dial a number the user selects an icon in the lower bar 5, named keypad 50. This results in a window being shown over a part of the desk, this window showing a standard telephone keypad. By simply selecting the right digits the user can dial a number of a party to be called. By selecting the keypad icon 50 again, the keypad window disappears.

Other icons are present in the lower bar 5, like a speed dial icon. This icon results in a window being displayed, comprising names of parties whose numbers are preprogrammed in the terminal. By simply selecting a name, the user can make the terminal dialling the corresponding number.

Figure 11:
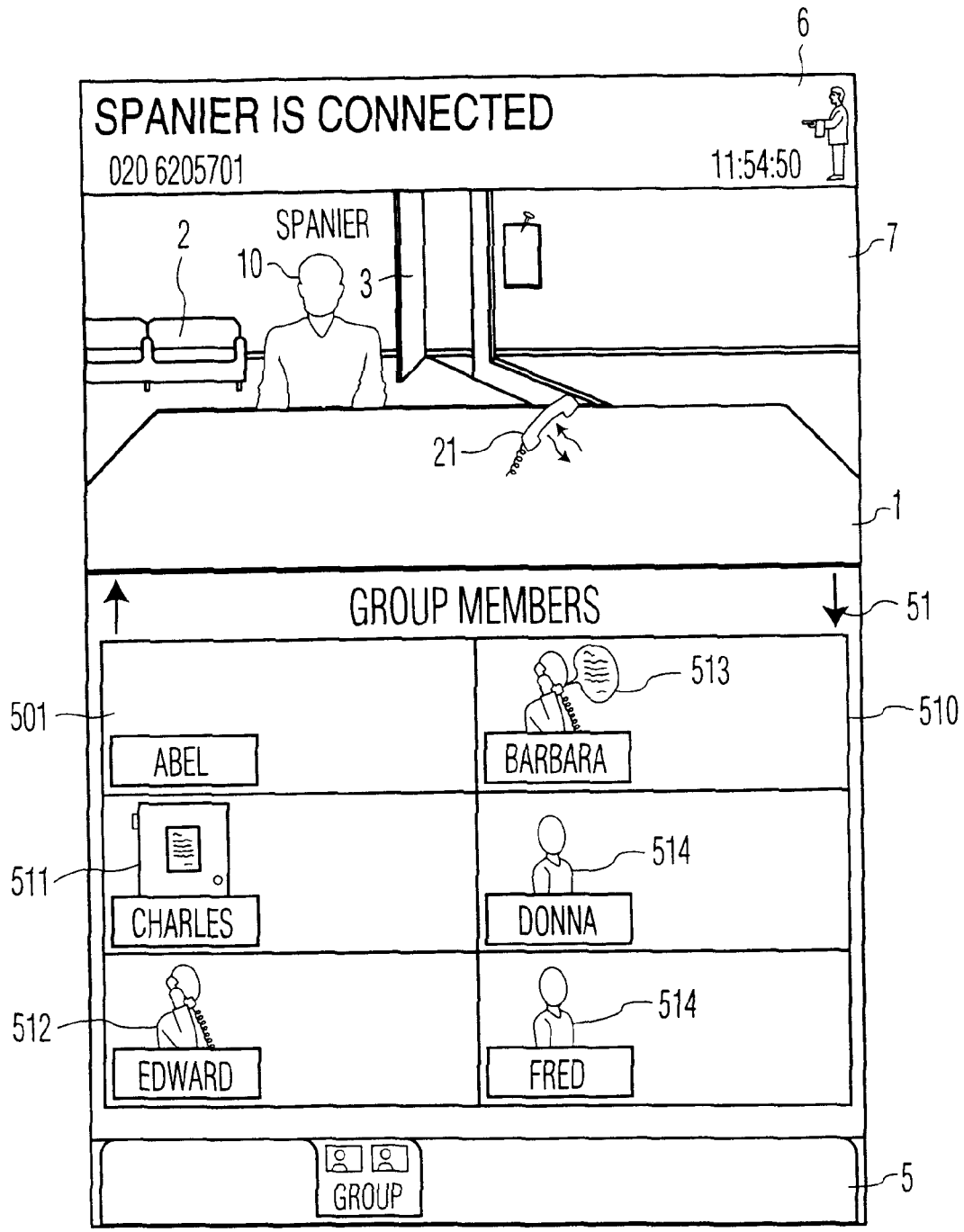

The lower bar 5 also comprises a group icon 51. Selecting this icon results in a window being displayed over part of the desk comprising a group sheet 510. This is shown in FIG. 11. The group sheet shows the state of a number of other terminals connected to the communication network, together forming the group. Monitoring of group members is well known in state of the art communication systems. In terminals like the business phone of Philips Sopho-set S375(D), having the possibility to monitor the states of members of a group, this monitoring is done by use of LEDs. In the terminal according to the present invention, however icons are used, as shown in FIG. 11. An absent group member is represented by an empty room 501, A group member, who does not want to be disturbed is represented by a closed door with a note 511, a group member who is dialling is represented by a calling figurine 512, a group member who has a call in the connected state is represented by a calling figurine with a text balloon 513 and a group member who is present and in the idle state is represented by a figurine seen from beside 514. The group sheet gives the user at a glance the states of all his group members. Furthermore an idle group member can be called in a very simple way by just selecting the icon representing him. This can be done even while a party in the connected call state is present. When the group member is called, this party is put on-hold automatically.

The embodiments of the present invention described herein are intended to be taken in an illustrative sense and not in a limiting sense. Various modifications may be made to these embodiments by persons skilled in the art without departing from the scope of the present invention as defined in the appended claims.

We claim:

1. A communication terminal for use in a communication system, which terminal comprises a display unit having a display screen, which is arranged for at least representing graphical data, and which terminal comprises control means for changing terminal call states on the basis of control signals received from other terminals in the system and of control signals generated by the terminal itself, call states of the terminal including an incoming call state and a connected call state, the control means further generating call state dependent icons of different sizes or shapes on different predetermined locations of the screen in combination with a different appearance of the icons at the different locations, which different appearance of the icons represents terminal users in different call states, in dependence on internal call states of the terminal, and displaying the icons on the display screen in a quasi three-dimensional communication scene including a depth dimension represented by perspective so as to graphically represent terminal users involved in a communication scenario, the icons being generated to produce a substantial change of the communication scene upon a call state change of the terminal.

2. A terminal as claimed in claim 1, wherein the different appearance of the icons is represented in the form of figurines.

3. A terminal as claimed in claim 2, wherein an incoming call state is represented by a waving figurine.

4. A terminal as claimed in claim 2, wherein a connected call state is represented by a figurine standing in front of a desk.

5. A terminal as claimed in claim 2, wherein the call states further include an on-hold call state being represented by a figurine sitting on a couch.

6. A communication terminal as claimed in claim 1, wherein the different appearance of the icons is represented in the form of a change of the quasi three-dimensional communication scene.

7. A terminal as claimed in claim 6, wherein the communication scenario represents a call between a terminal user of the terminal and a terminal user of another terminal in the system, the terminal comprises icon selection means, and the control means is arranged to generate and display a conference call icon on the screen as the change of the quasi three-dimensional communication scene and to set up a conference call between terminal users of different terminals in the system, upon selection of the conference call icon by actuation means actuated by the terminal user of the terminal and upon selection of an on-hold icon representing a still further terminal terminal user in on-hold state.

8. A terminal as claimed in claim 6, wherein the control means is arranged to display a call blocking icon on the screen as the change of the quasi three-dimensional communication scene, and to block incoming calls to the terminal upon selection of the call blocking icon by the terminal user.

9. A terminal as claimed in claim 8, wherein the control means generates and displays the call blocking icon as a door icon, an open door representing a blocked incoming call state of the terminal and a closed door representing a non-blocked incoming call state of the terminal.

10. A terminal as claimed in claim 6, wherein the control means is arranged to generate and display a light switch icon on the screen as the change of the quasi three-dimensional communication scene, and to generate a strong contrast changing part on the screen representing presence or absence of the terminal user.

11. A terminal as claimed in claim 6, wherein the control means is arranged to generate and display a group member area on the screen, which area is partitioned so as to separately represent terminal users of different terminals in the system as group members in the group member area, the control means further being arranged to modify the appearance of the partitions in dependence of the call states of the different terminal users, the chance of the quasi three-dimensional communication scene being a selection from icons in a group of icons represented in the form of figurines and of icons represented in a form other than figurines.

12. A terminal as claimed in claim 1, wherein the communication scenario represents a call between at least two terminal users of different terminals in the system, and the control means is arranged for transferring a call between terminal users upon selection of a terminal user represented by an on-hold call state icon an of a terminal user represented by a connected call state icon.

13. A communication system comprising a terminal comprising a display unit having a display screen, which is arranged for at least representing graphical data, and which terminal comprises control means for changing terminal call states on the basis of control signals received from other terminals in the system and of control signals generated by the terminal itself, call states of the terminal including an incoming call state and a connected call state, the control means further generating call state dependent icons of different sizes or shapes on different predetermined locations of the screen in combination with a different appearance of the icons at the different locations, which different appearance of the icons represents terminal users in different call states, in dependence on internal call states of the terminal, and displaying the icons on the display screen a quasi three-dimensional communication scene including a depth dimension represented by perspective so as to graphically represent terminal users involved in a communication scenario, the icons being generated to produce a substantial change of the communication scene upon a call state change of the terminal.

\* \* \* \* \*